Figure 1:
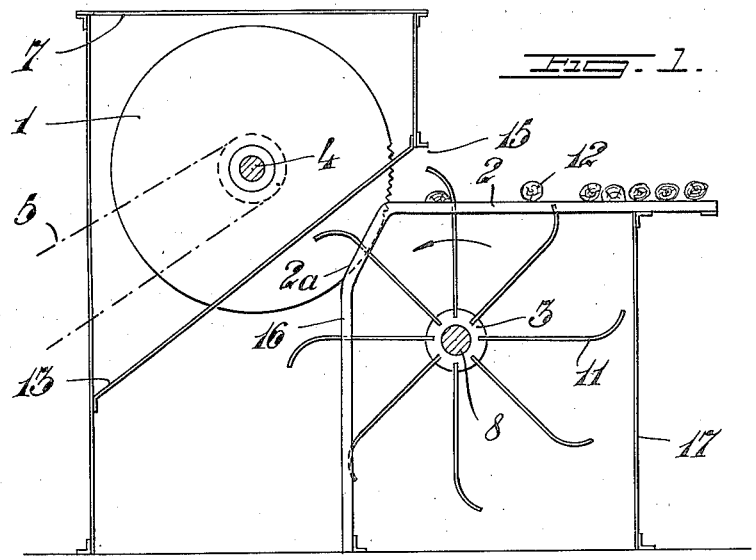

Oct. 24, 1944.   L. NORDSTRÖM   2,361,147

WOOD CUTTING MACHINE

Filed Nov. 2, 1942

Inventor
Leon Nordström
by Sommers + Young
Attorneys

Patented Oct. 24, 1944

2,361,147

UNITED STATES PATENT OFFICE 2,361,147

WOODCUTTING MACHINE

Leon Nordström, Stockholm, Sweden

Application November 2, 1942, Serial No. 464,241
In Sweden July 2, 1940

1 Claim. (Cl. 143—57)

This invention relates to cross cutting saws and particularly to a machine for cutting wood into pieces of a length making them suitable for the purpose of charging gas producers.

An object of the invention is the provision of a machine of the type indicated having a plurality of parallel circular saws and means for uniformly feeding the wood, as logs or billets, to said saws and forcing them thereagainst without shock or jerk irrespective of the varying shape and size of the logs or billets or the varying thickness thereof at different portions of their length.

Another object of the invention is the provision of means for positively removing the pieces from between the saws as soon as they have been severed.

With these and other objects in view, the invention consists in certain details of construction and combination and arrangements of parts, as will hereinafter be more fully described, reference being had to the accompanying drawing.

Figure 2:
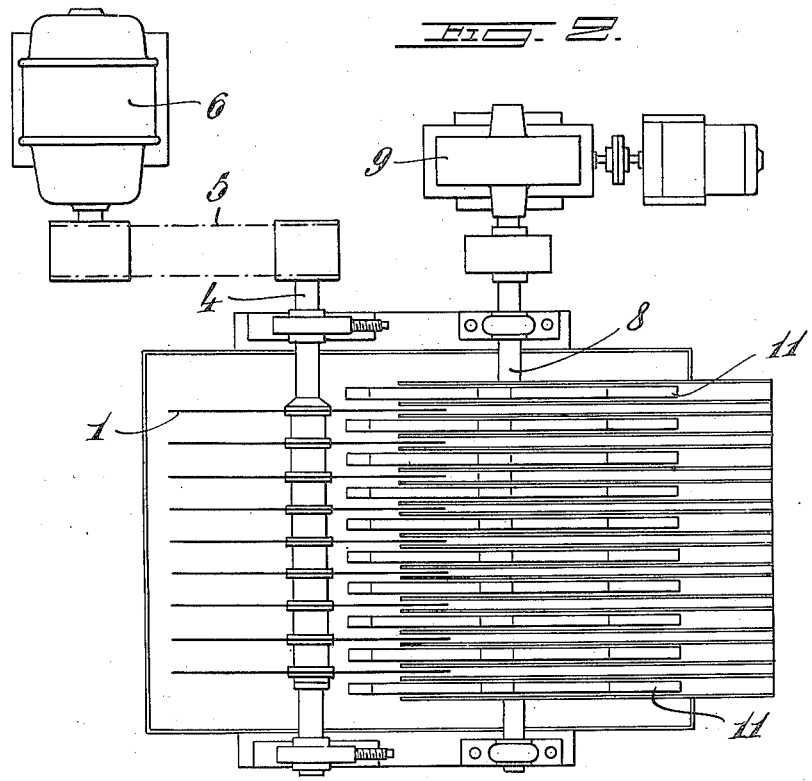

In the drawing:

Figure 1 is a side elevation of a machine illustrating the preferred embodiment of the present invention and Figure 2 is a top plan view thereof.

The machine comprises three main parts, viz. a series of circular saws 1, a table 2 in front thereof, and a series of feeding wheels 3, 11 provided below the table by means of which the wood to be cut is fed forward on the table and forced against the saws. The circular saws 1 are arranged parallel to each other on a rotatably mounted shaft 4 driven from an electric motor 6 by means of a belt transmission 5 or the like. The mutual distances of the saws 1 are determined by the desired length of the pieces into which the wood is to be cut by the saws. The saws are enclosed in a housing 7, the front wall of which ends at a certain distance from the top of the table so as to provide an inlet aperture 15 for the wood.

The feeding wheels are situated in register with the spaces between the saws 1. They comprise hubs 3 secured to a common shaft 8 which is driven by a worm gear drive 9 from an electric motor 6, and arms 11 projecting radially from said hubs. The arms 11 preferably consist of elastic flat steel bars, the small surfaces (edges) of which are situated in planes passing through the shaft 8. The free ends of the arms 11 are preferably bent forwardly in the direction of rotation of shaft 8, thereby enabling the arms to more readily grasp the wood supported by the table 2. In addition, the curved ends of the feeding arms act to more firmly hold the wood during the cutting operation. The arms feed a log or billet 12 at a time towards the saws and force it thereagainst to cause the saws to sever the log or billet into a plurality of pieces. The feeding arms due to their flexibility act to remove the severed pieces from between the saws by throwing them forwardly and downwardly. In order to prevent the pieces severed from being jammed between the saws and carried around thereby, oblique bars 13 may be provided between each two saws, as indicated in Fig. 1.

In the example shown, the table 2 is made up of a plurality of edgewisely arranged bar irons 16, the ends of which adjacent the saws are bent downwardly so as to provide vertical portions or legs each bearing at its lower end on the floor and sloping portions 2a at the transition between the horizontal and vertical portions of the bars upon which the pieces severed may slide down. At their ends remote from the circular saws the bar irons 16 are supported by a wall 17. The bar irons 16 are preferably connected in pairs, the two bars of each pair being situated at a comparatively small distance apart, suited so as to form a sufficient space for the respective saw. Between each two adjacent pairs more wide spaces are provided to receive the arms 11 of the feeding wheels.

Instead of bar irons I may use laths or deals in constructing the table. Said laths or deals are placed edgewisely at appropriate distances apart to allow the feeding arms to pass between them. Each individual lath or deal is formed with a slot at its end facing the saws in order to receive the respective saw. In this case each individual lath or deal may replace a pair of bar irons of the embodiment previously described.

What I claim is:

A machine for cutting logs into short pieces comprising in combination, a driven shaft, a plurality of parallel circular saws on said shaft, a wood supporting table in front of said saws comprising pairs of horizontally and vertically extending bars arranged so as to form slots in register with the individual saws and other slots arranged alternately therewith, another driven shaft arranged inside said table, and a plurality of feeding wheels on said other shaft, each comprising a set of individually flexible pusher arms, adapted on the rotation of the wheels to pass through said other slots while feeding the logs supported on the table towards the saws irrespective of the regular or irregular shape of the logs.

LEON NORDSTRÖM.